United States Patent
Menary

[11] 3,856,414
[45] Dec. 24, 1974

[54] APPARATUS FOR INSPECTING STRIP MATERIAL

[75] Inventor: Robert F. Menary, Northbrook, Ill.

[73] Assignee: Paulmar, Incorporated, Northbrook, Ill.

[22] Filed: Jan. 18, 1973

[21] Appl. No.: 324,674

[52] U.S. Cl. ............... 356/200, 356/209, 356/237
[51] Int. Cl. ........................................ G01n 21/32
[58] Field of Search .......... 356/200, 209, 244, 199, 356/237; 250/219 DF, 219 TH, 562, 572; 73/157

[56] References Cited
UNITED STATES PATENTS

| | | | |
|---|---|---|---|
| 1,988,255 | 1/1935 | Soons | 356/199 X |
| 2,699,676 | 1/1955 | Grunwald et al. | 73/157 |
| 3,019,346 | 1/1962 | Laycak | 250/219 DF |
| 3,430,055 | 2/1969 | Metzger | 356/237 X |
| 3,518,441 | 6/1970 | Selgin | 250/219 TH |
| 3,578,977 | 5/1971 | Natelson | 356/200 X |
| 3,588,513 | 6/1971 | Akamatsu | 250/562 |
| 3,613,444 | 10/1971 | Grunwald et al. | 73/157 |
| 3,636,917 | 1/1972 | Baker | 250/219 TH X |
| 3,717,171 | 2/1973 | Fawkes | 350/96 CB UX |

FOREIGN PATENTS OR APPLICATIONS

| | | | |
|---|---|---|---|
| 894,570 | 4/1962 | Great Britain | 250/562 |

Primary Examiner—Ronald L. Wibert
Assistant Examiner—Matthew W. Koren
Attorney, Agent, or Firm—Guy A. Greenawalt

[57] ABSTRACT

An apparatus for inspecting motion picture film, or similar strip material, so as to locate defects or damaged areas, such as edge cuts and tears, sprocket hole tears, improper splices and the addition of foreign material on the film surface which it is desirable to eliminate before the film is used, which apparatus comprises an inspection head with one or more inspection stations where the film is advanced over a supporting surface and light beams are directed onto the film surface by means of fiber optic cables which receive light from a light source through a common terminal box with the light beams actuating, by direct or reflected rays, light sensors which are located in ray receiving position at the inspection station or stations. The light sensors are connected into an electrical circuit controlling the film travel so as to enable the film travel to be interrupted and suitable repairs made as needed to place the film in proper condition for use.

19 Claims, 18 Drawing Figures

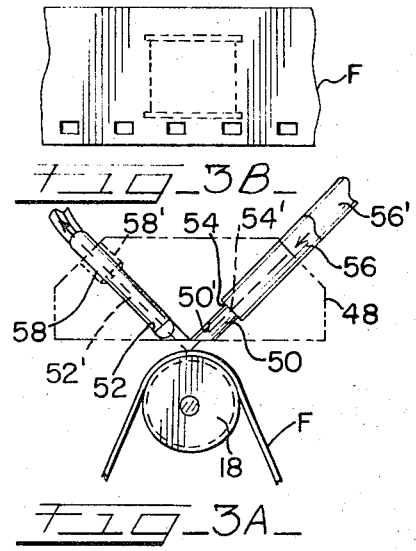
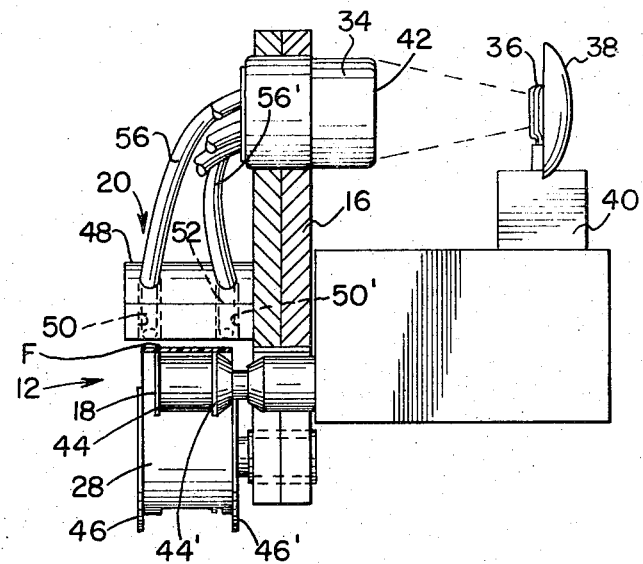
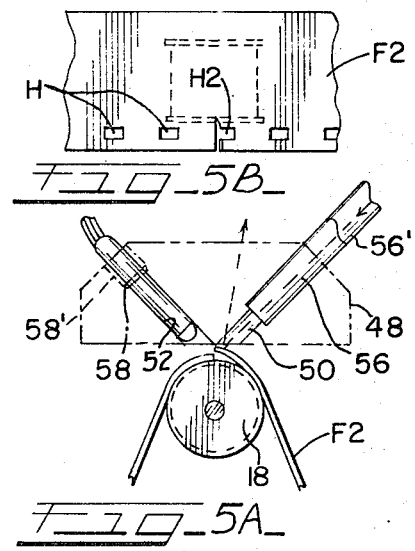
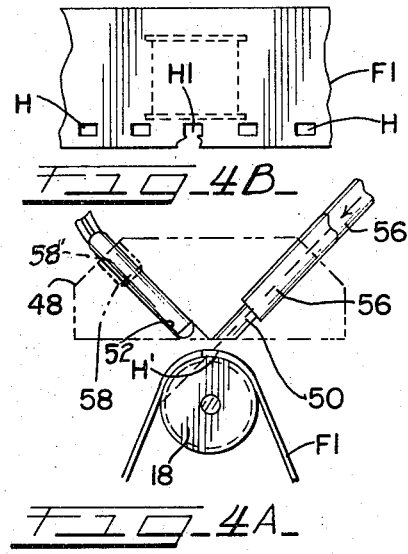
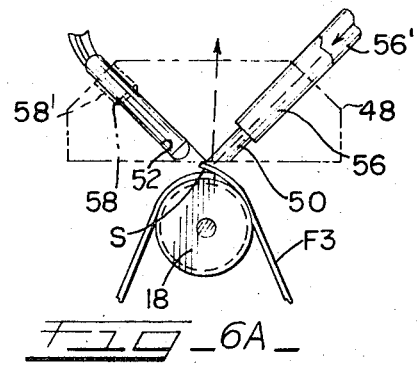
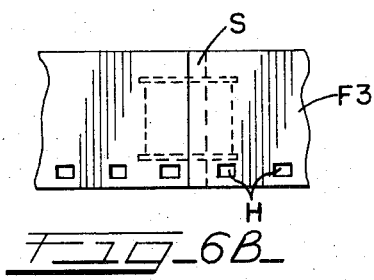

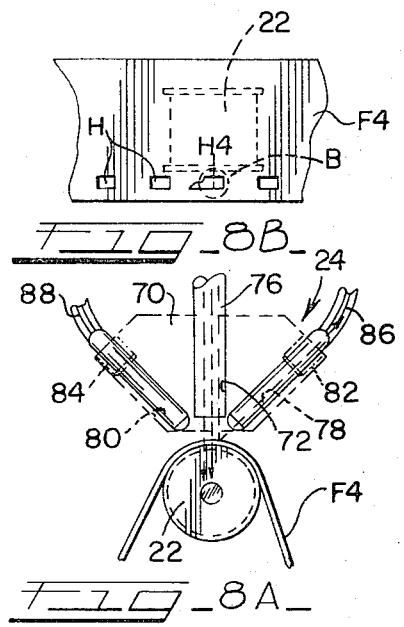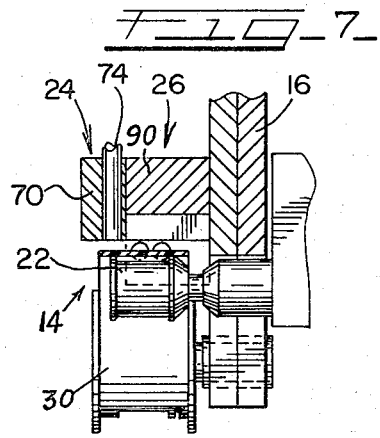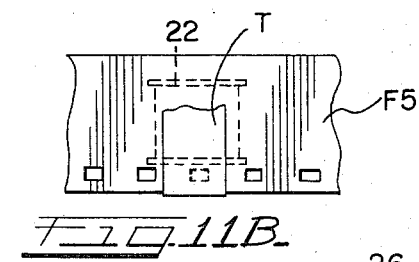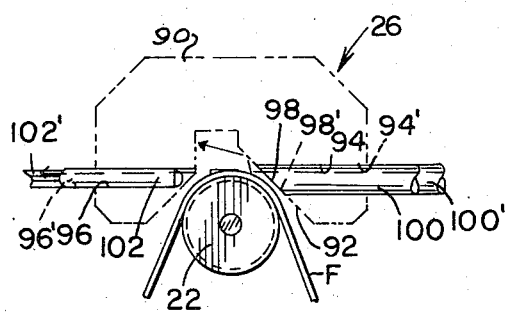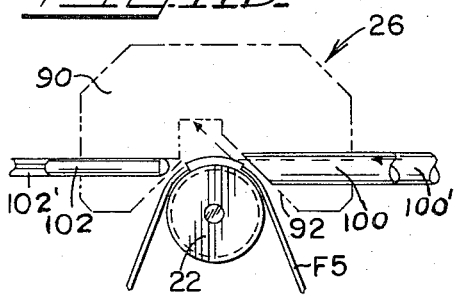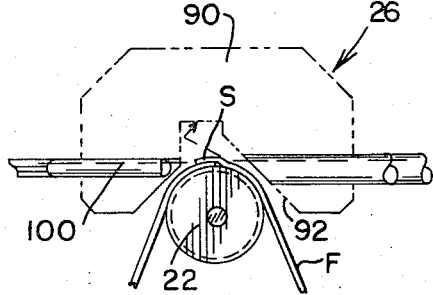

APPARATUS FOR INSPECTING STRIP MATERIAL

This invention relates to apparatus for inpsecting strip material, such as motion picture film, video and audio tape, and similar strip material, and is more particularly concerned with improvements in apparatus for detecting variations in thickness due to splices, warped or burned spots, punched holes or the addition of foreign material to the film or tape, such as pieces of Scotch tape or the like, and to breaks in the material due to edge cuts or tears, torn sprocket holes or the like.

In the handling of motion picture film and similar strip material, which is subject to damage in use, it is desirable to inspect the material for damage or defects after each use, particularly in the case of commercial movie film when it is returned by an exhibitor, so that any defects can be located and appropriate repairs made before the film is sent on to another exhibitor. In order to avoid trouble with the film when it is run through a film projecting machine, it is necessary to detect and remove objectionable defects. Machines have heretofore been developed which automatically detect film defects or damage and also film thickness variations and which may be adjusted to pass splices of acceptable thickness and length while stopping the film travel when there are objectionable splices or other defects so as to enable the operator to remove the defective or damaged portion of the film and substitute a proper slice. Machines of this character are shown in my U.S. Pat. Nos. 3,180,143, granted Apr. 27, 1965; 3,501,760, granted Mar. 17, 1970; and 3,693,430, granted Sept. 26, 1972. These machines comprise a film feeding apparatus responsive to a defect detecting head through which the film runs and which is operative when objectionable film defects are present to automatically stop the film feed and permit the operator to make appropriate repairs. While these machines and others of similar construction have operated in a satisfactory manner, there are some limitations on their use. The detecting apparatus in these machines includes mechanical detecting or sensing elements which engage the film surface and their use involves some risk of damage to the film, particularly, when operating at high speed. It is a principal object, therefore, of the present invention to provide an improved apparatus for inspecting movie film or similar strip material which does not employ mechanical sensing elements for contacting the material being inspected, which can be readily adjusted to allow defects of a predetermined character to pass through and to detect other defects which it is desired to examine and to stop the travel of the material, or actuate a signal, and thereby enable the operator to examine the defect and determine the need for repairs and which requires a relatively simple electrical control circuit.

It is a more specific object of the invention to provide in a machine for inspecting film and other strip materials, apparatus for detecting variations in thickness, the presence of foreign material on the surface, such as, an undesirable length of Scotch tape, sprocket hole tears, edge cuts or tears and other defects or damage to the material, which apparatus employs light actuated sensors thereby enabling the inspection to be accomplished rapidly and in a highly satisfactory manner without risk of damage to the surface of the material which is being inspected by the inspecting apparatus.

Another object of the invention is to provide an inspection machine for movie film or similar strip material having a detecting head through which the film or strip material is passed which detecting head incorporates defect detecting sensor elements which are actuated by light beams and associated elements for directing beams of light onto the surface of the material in such a manner that the sensor elements are actuated when a defect of a predetermined character is presented in the detecting area so as to interfere with the light beam.

A further object of the invention is to provide an apparatus for inspecting movie film or the like which incorporates therein an inspection station where a light beam is directed onto the film by means of a light conducting fiber optic cable running from a light receiving terminal and where an associated light actuated sensor is positioned to receive reflected portions of the beam which sensor is connected into the control circuit for the film drive so as to automatically stop the travel of the film when a defect of predetermined character appears.

A still further object of the invention is to provide an apparatus for inspecting movie film or similar strip material which comprises an inspection head, through which the film is fed, with one or more inspection stations where the film is advanced over a support member providing laterally spaced, curved surfaces which are disposed beneath a mounting block in which a beam emitting light conductor is supported so as to direct a beam of light onto an area of the film in which a tear or similar defect is likely to be found, the beam being directed at an angle to the film surface so that when the film is normal the beam will be reflected to the receiving end of a sensor which is responsive to changes in the reflected light, the sensor being connected into the film drive circuit so as to interrupt the advance of the film when there is a change in the reflected light due to the presence of an edge tear or similar defect.

Another object of the invention is to provide an apparatus for detecting in a movie film or similar strip material which comprises an inspection head, through which the film is fed, with an inspection station where the film is supported for travel over axially spaced, peripheral ribs or flanges on an upwardly bowed or curved film support member which is disposed beneath a mounting block member having a light emitting end of a light conduit arranged to direct a beam of light onto the curved surface of the film which contains the sprocket holes and a pair of light sensors disposed so as to receive reflected light when the film is normal and connected into the control circuit for the film feed so that the advance of the film will be stopped when actuation of the sensors is changed by the appearance of a torn sprocket hole.

Still another object of the invention is to provide an apparatus for inspecting film or tape material which may have splices and the surface of which may be marred by the presence of one or more lengths of adhesive tape or the like wherein an inspection station is provided with a curved film support and a sensing device in the form of a block having mounted therein the discharge end of a light conduit or cable which is positioned to direct a beam of light across the upwardly bowed surface of the film and into the receiving end of a light sensor connected into a control circuit for the film feed, with provision for adjusting the portion of the beam which is not deflected by the passage of film of normal thickness and the sensor being actuated to stop the feed when there is a change in the thickness of the film resulting from a splice exceeding a predetermined length or thickness, or the presence on the film surface of a length of adhesive tape or other foreign material.

These and other objects and advantages of the invention will be apparent from a consideration of the apparatus for inspecting movie film which is shown by way of illustration in the accompanying drawings wherein:

FIG. 2 is a cross sectional view taken generally on the line 2—2 of FIG. 1, showing the mechanism provided at the first inspection station for inspecting sprocket hole and sound edge portions of a movie film;

FIG. 3A is a schematic elevation showing the mechanism for edge inspection at the first inspection station when operating upon a section of movie film which is in normal condition;

FIG. 3B is a plan view of a section of movie film in normal condition as illustrated in FIG. 3A;

FIG. 4A is a schematic elevation showing the mechanism for edge inspection at the first inspection station when operating upon a section of movie film having an edge tear out;

FIG. 4B is a plan view of a section of film having an edge tear out as illustrated in FIG. 4A;

FIG. 5A is a schematic elevation showing the mechanism for edge inspection at the first inspection station when operating upon a section of movie film having a cut in the edge thereof;

FIG. 5B is a plan view of a section of movie film having an edge cut as illustrated in FIG. 5A;

FIG. 6A is a schematic elevation showing the mechanism for edge inspection at the first inspection station when operating upon a section of movie film having an imperfect splice which is partially opened up;

FIG. 6B is a plan view of a section of movie film having a defective splice which is partially opened as illustrated in FIG. 6A;

FIG. 7 is a cross sectional view taken generally on the line 7—7 of FIG. 1, showing the mechanisms for film splice count and thickness inspection and the mechanism for sprocket hole inspection at the second inspection station;

FIG. 8A is a schematic elevation showing the mechanism for sprocket hole inspection when operating upon a section of movie film having a torn sprocket hole;

FIG. 8B is a plan view of a section of movie film having a sprocket hole with an elongate tear as illustrated in FIG. 8A;

FIG. 9 is a schematic elevation showing the mechanism for inspecting the film for thickness variations due to splices or the presence of tape and for counting splices, the view showing a normal tape length lying on the support roller;

FIG. 10 is a schematic elevation showing the mechanism for inspecting thickness variations when operating upon a section of film having a splice which is of acceptable length;

FIG. 11A is a schematic elevation showing the mechanism for inspecting thickness variations when operating on a section of movie film having a piece of Scotch tape, or the like, on the surface;

FIG. 11B is a plan view of a section of movie film having a length of Scotch tape or the like on the surface thereof as shown in FIG. 11A.

Figure 1:
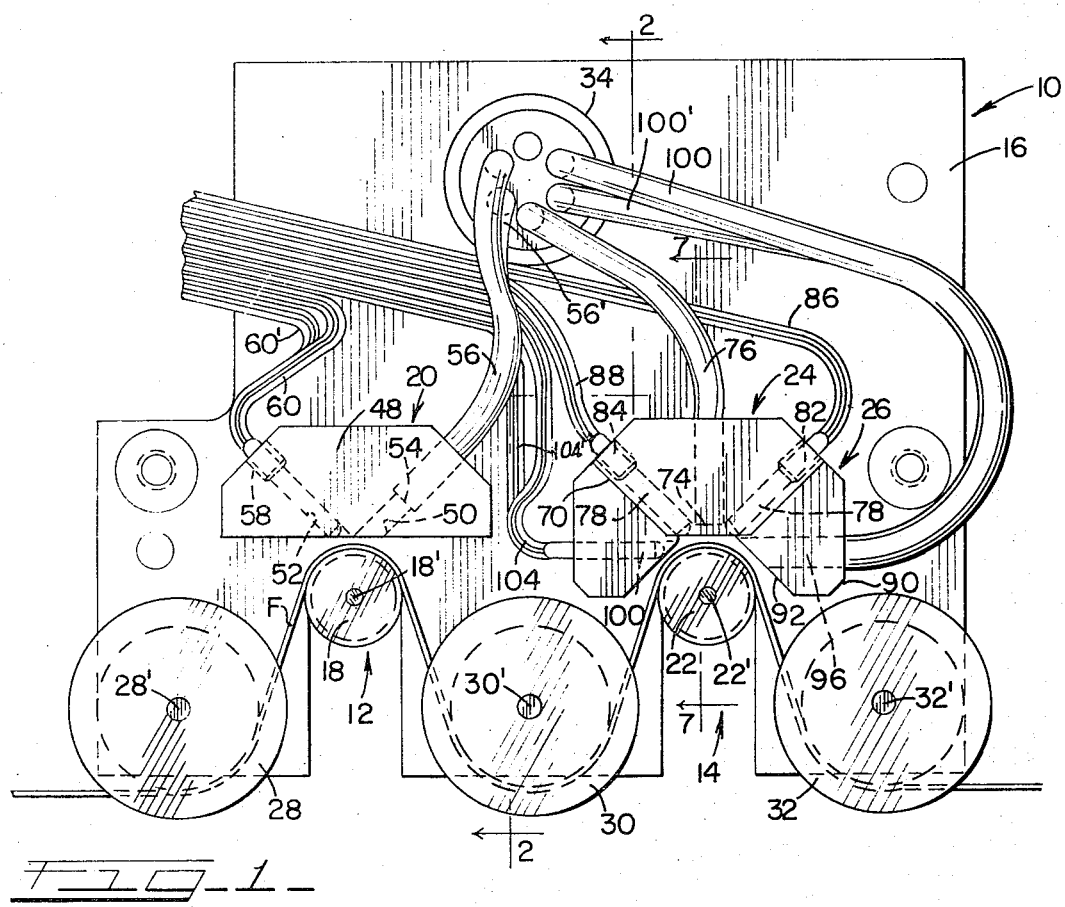
FIG. 1 is an elevational view of a defect detector mechanism for movie film which is adapted for incorporation in a film inspection machine and which embodies therein the principal features of the invention.

Referring first to FIG. 1 of the drawings, there is shown, for the purpose of illustration, an inspection head 10 designed particularly for incorporation in a machine for inspecting movie film, the principles embodied being applicable to the design of apparatus for inspecting video and audio tapes and other tape materials of similar character which are subject to the same or similar damage when used. The illustrated inspection head 10 includes two inspection stations 12 and 14 having inspecting mechanisms which are adapted to detect defects or damaged areas which it is desirable to examine and which are, from experience in handling movie film commercially, frequently found when a movie film has had a period of use. The character of these typically damaged areas and the manner in which they are detected is illustrated in FIGS. 2 to 11 of the drawings.

The inspection head 10 comprises a mounting plate 16 which is adapted to be secured in a generally vertical plane on a suitable supporting cabinet or frame structure (not shown). On the front face of the plate 16 two film inspection stations 12 and 14 are provided which are spaced along the lower margin. The first inspection station 12 has a film supporting roller member 18 above which there is mounted a mechanism 20 for inspecting the side marginal or side edge portions of the film for defects, such as, edge cuts or tears and also weakened or partially opened splices. At the second inspection station 14, there is a film supporting roller 22 above which there is mounted a mechanism 24 for inspecting the sprocket holes, which are found along a margin of the film, for tears, or the like, and also a mechanism 26 for inspecting the film for thickness variations due to improper splices or the presence of pieces of tape on the film surface. The latter mechanism may also be utilized to count the number of splices. Three film guide rollers 28, 30 and 32, which are mounted below the film support rollers 18 and 22, provide a path for holding the film in engagement with the inspection station rollers 18 and 22. A suitable drive for the film is provided which includes an electric motor together with a control circuit (FIG. 12) which is reponsive to the operation of the film inspection mechanisms 20, 24 and 26.

The film inspection mechanisms 20, 24 and 26 (FIGS. 1 and 2) are supplied with light beams through a series of fiber optic light beam cables or conduits 56, 56', 76, 100 and 100' leading to an input terminal block or box 34, the back face of which is disposed opposite a light source in the form of a lamp 36. The lamp 36 has an associated light reflector 38 mounted on a rearwardly extending frame portion 40 and directing the light to the back face 42 of the terminal box 34 where the input or receiving ends of the light beam cables or conduits are exposed so as to receive the light. The single light source 36 which provides the required light beams for the several inspection units 20, 24 and 26 is preferably a tungsten halligen light unit which emits a high concentration of light of a type which maintains its intensity and output throughout its life as opposed to the gradual diminishing values of conventional incandescent bulbs.

The film support rollers 18 and 22 are of similar construction, each having an axial dimension as shown in FIGS. 2 and 7 which is less than the width of the film with end flanges 44 and 44' on the peripheral edges of which the film F rides so that the film is supported inboard of its margins. The roller flanges 44 and 44' support the film at the inner edge of the line of sprocket holes which is along one side margin of the film and at the inner edge of the sound track which is along the other side margin, leaving the major film area unsupported. The rollers 18 and 22 are mounted for free rotation on support shafts 18' and 22' extending outboard of the front face of the mounting plate 16. The guide rollers or idler rollers 28, 30 and 32 each have end flanges 46 and 46' with a film supporting hub portion having an axial dimension corresponding to the film width. The rollers 28, 30 and 32 are mounted for free rotation on supporting shafts 28', 30' and 32' extending outboard of the front face of the mounting plate below the film support rollers 18 and 22 so as to guide the film in a path extending up, over and down around the support rollers 18 and 22.

Figure 12:
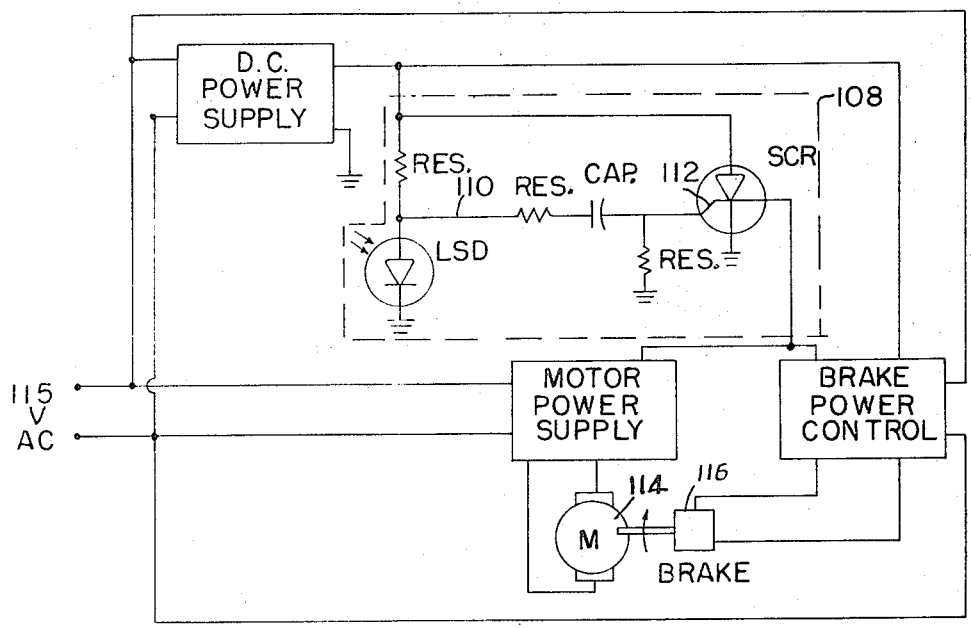
FIG. 12 is a diagrammatic layout of an appropriate electrical circuit for operating the inspection machine.

The inspection mechanism 20 at the first inspection station 12 (FIGS. 1, 2, 3A and 3B) comprises a mounting block 48 having two pairs of angularly related bores 50, 52 and 50', 52' for mounting therein the beam emitting ends 54 and 54' of fiber optic light conduits or cables 56 and 56' and the light sensors 58 and 58', the latter being connected by cables 60 and 60' into the electrical control circuit for the film drive as illustrated in FIG. 12. The light beam emitting cable ends 54 and 54' are disposed in the same vertical planes and at a 90° angle relative to the light receiving bores 52 and 52' in which the sensors 58 and 58' are mounted so that when the film surface is normal as shown in FIG. 3B the light beams will be deflected, as shown in FIG. 3A, and the sensors 58 and 58' will be operated so that there will be no interruption of the film drive. The beam emitting conduit end 54 and the associated light receiving bore 52 are aligned relative to the sprocket holes H at one side of the film so that when a section of film F1 (FIG. 4B) having a torn out sprocket hole H1 arrives at the inspection station 12 the light beam from cable end 54 is diverted and is not reflected into the beam receiving bore 52 (FIG. 4A), with the result that the sensor 58 is actuated to stop the film drive. The light beam emitting member 54' and associated light beam receiving bore 52' are aligned relative to the sound track along the opposite side margin of the film so as to stop the film drive when there is a tear out on that side of the film. When a film section F2 (FIG. 5B) having an edge cut or tear, as indicated at H2, arrives at the inspection station 12 the torn or cut portion will rise due to bending stress as it passes over the support roller 18 (FIG. 5A) and the light beam will be deflected as shown, with the result that the sensor 58 will be actuated to stop the film travel. When a film section F3 (FIG. 6B) having a weak splice S arrives at the inspection station 12 the film traverses the curved path around the top of the support roller 18 which causes the loose end of the film to spring upwardly with the result that the light beams will be deflected from their normal paths, as shown, and the sensors 58 and 58' will be actuated to stop the film travel.

At the second inspection station 14 the two inspection units or devices 24 and 26 are aligned above the film support roller 22 with the outermost unit 24 comprising a mounting block 70 which is disposed, as shown in FIGS. 1, 7 and 8A. The mounting block 70 has a vertical bore 72 in which a beam emitting end 74 of a light beam transmitting fiber optic cable member 76 is mounted, with the other end thereof mounted in the terminal block 34. Two bores 78 and 80 in the same vertical plane are arranged at a 90° angle to each other, and at a 45° angle on each side of the beam emitting end member 74, which bores 78 and 80 have mounted therein light actuated sensors 82 and 84, the latter being connected into the film drive motor control circuit by electric cables 86 and 88. The light emitting member 74 is positioned with the beam directed so that a spot B (FIG. 8B) of light is projected onto the film surface and the two light receiving sensor members 82 and 84 are positioned to receive light beams reflected from the leading and trailing edges of a normal sprocket hole which is centered relative to the beam emitter member 74. The arrangement is such that a reflected portion of the emitted beam will be directed into one or the other or both of the two bores 78 and 80 in which the beam receiving sensor members 82 and 84 are mounted while film with normal sprocket holes is advancing around the surface of the support roller 22 and there is no change in the operation of the associated sensors 82 and 84. The passage of a section of film F4 (FIG. 8B) having an elongated sprocket hole H4 will allow the light beam to pass through the enlarged hole and light reflected to both sensors 82 and 84 will be cut off simultaneously or reduced sufficiently so that the sensors will operate to stop the film drive. The light beam from the fiber optic cable member 76 provides a spot of light on the surface of the film area which is very definite and measurable, but variable, so that a spot of definite, predetermined dimensions can be beamed onto the film surface. Normally a beam is employed of a size which provides a spot B having a dimension in the direction of film travel which is somewhat greater than the length of a normal sprocket hole, as indicated in FIG. 8B. A beam providing a larger or smaller spot of light on the film can be employed so that the size of the defect to be picked up can be varied. The size of the defect to be picked up can be varied also by adjusting the position of the support member 22 relative to the sensor support block 70.

The innermost inspection unit 26 which constitutes a device for foreign tape detection and splice detection at the second inspection station 14 comprises a mounting block or frame member 90 having a generally V-shaped recess 92 in the bottom face for positioning relative to the film support roller 22 so that the top portion of the film support roller 22 extends into the recess 92 as shown in FIGS. 1, 7, 9, 10 and 11A. The mounting block or frame member 90 has horizontally aligned pairs of holes 94, 94' and 96, 96' opening in the recess 92. The beam emitting ends 98 and 98' of light conducting fiber optic cables 100 and 100' are mounted in the bores 94, 94'. The light transmitting cables or conduits 100 and 100' have their opposite or receiving ends mounted in the terminal block 34 and receive light from the lamp source 36. Light actuated sensors 102 and 102' are mounted in the bores 96 and 96' and connected by electric cables 104 and 104' into the motor control circuit. The position of the mounting block 90 relative to the film support roller 22 is adjusted so that a beam of light is directed by the position of each of the cable ends 98 and 98' across the top of the film support roller 22 at a level or elevation which partially clears the upwardly bowed surface of the normal film F with a portion of the beam traveling directly to the associated sensors 102 and 102' when the film has normal thickness as shown in FIG. 9. When a splice of permissible size appears as shown at S in FIG. 10 the light beam is deflected for a relatively short time period which is not sufficient to cause the associated sensor 102 and 102' to stop the film travel but is sufficient to actuate a splice counter (not shown). When a film section F5 traverses the roller 22 with a splice which is longer than desired or a length of tape T, the light beam portions normally traveling to the sensors will be interrupted for a length of time sufficient to actuate the sensors 102 and 102' and stop the film travel.

Referring to FIG. 12, there is illustrated a suitable power supply and control circuit for a film inspection machine in which the sensor control circuit is indicated at 108, with each of the sensors being in the form of a light sensitive diode LSD which is responsive to changes in the light received. Only one LSD is shown, it being understood that any number of LSD units may be used, depending upon the areas of the film or tape it is desired to scan and the type of defect to be detected. The LSD is connected through line 110 with suitable resistors and a capacitor to the gate 112 of a silicon control rectifier SCR which when fired will cut off the film drive motor 114 and turn on the brake 116 so as to stop the film travel. The SCR may be replaced by any resettable temporary memory, such as, a bistable multi-vibrator, etc.

The detecting block members 48, 70 and 90 are mounted so that they can be initially adjusted relative to the film support rollers 18 and 22 to enable the light beam or beams to be properly positioned relative to the film or tape surface which is to be inspected.

While the arrangement shown in FIGS. 9, 10 and 11A for inspecting and counting splices and detecting the presence of strips of tape or the like on the surface of the material being inspected will operate in a highly satisfactory manner, an alternative arrangement may be employed with a beam emitter and sensor arrangement employing the system shown in FIG. 8A but with two spaced beam emitters and a sensor on each side of the pair, the sensors being positioned and adjusted so as to pass a splice of proper length and to stop the machine when a splice of excessive length appears. Also, the location of the sensors and light beams may be interchanged.

The sensors in the mounting blocks 48 and 70 are set in the outer ends of the bores for ease in mounting and replacement leaving a length of bore forming a tunnel leading to the light admitting face of the sensor from the recess in the mounting block. If desired this portion of the bore may be filled by placing therein a length of fiber optic conduit or cable which will conduct the beam received to the sensor device.

I claim:

1. An apparatus for inspecting a traveling film or tape material so as to detect areas of excessive thickness of predetermined length due to defective splices or the presence of adhesive tape, or the like, which constitute objectionable defects, said apparatus comprising an inspection station having a support means for the material with spaced members providing narrow curved surfaces extending in the direction of travel on which the material advances so that major portions thereof are unsupported and the material is bowed outwardly of said support means, drive means for advancing the material along said support means, a light source, a light transmitting fiber optic cable having its receiving end exposed to said light source and its emitting end supported at said inspection station in a position to direct a controlled beam of light in a predetermined direction lengthwise of the path of travel and in a plane normal to the curved surfaces of said support means so as to strike an area of the surface of the material traversing said support means whereby a predetermined increase in the effective thickness of the material due to an objectionable defect as it traverses the curved path at the inspection station will interfere with the projection of the light beam, a light actuated sensor means having an element mounted at said inspection station in a position to receive at least a portion of the light beam when the effective thickness of the material is within predetermined limits, said light sensor means being responsive to produce an output signal in response to changes in the light beam which result from interference with the projection of the light beam by the presence of an area of excessive thickness extending for a predetermined distance along the traveling material and constituting an objectionable defect in the material, and control means for said material driving means which is responsive to said output signal of said light sensor means so as to automatically stop the material drive means when material is presented at the inspection station which has an area of excessive thickness constituting an objectionable defect.

2. An apparatus for inspecting a traveling strip of film or tape material so as to detect areas of excessive thickness extending along the length of the material, torn edge portions or the like, which constitute objectionable defects, said apparatus comprising a support member having a curved guide surface over which the strip material is advanced, drive means for advancing the material over said support member so that the outermost surface advances along a path which is curved outwardly in the direction of travel and a defect sensing device mounted adjacent said support member which includes a light beam emitting member arranged to direct a controlled beam of light, at least in part, in the direction of the surface of the traveling strip material as it advances along said outwardly curved path and a light sensor means which produces an output signal in response to changes in the light received, said light beam emitting member and said sensor means being disposed in spaced relation in a longitudinal plane which is normal to said curved surface and having light emitting and light receiving faces, respectively, which faces are positioned relative to curved surface areas of the material advancing over said guide surface and to each other so that the light intensity received by the sensor means will be constant when the strip material presents a normal surface condition and when an area of excessive thickness constituting an objectionable defect of a predetermined character which changes the surface condition reaches said support member the light intensity received by said sensor means will be changed according to the change in the material surface, and means for controlling said drive means which is operated by said outoput signal when said output signal is produced in response to a change in the light received by said sensor means.

3. An apparatus for inspecting a traveling strip of film or tape material as set forth in claim 2 wherein said support member for the strip material is in the form of a pair of upwardly curved rib formations which are spaced apart a distance less than the width of the strip material so as to contact the strip material which is supported thereon on lines inwardly of the side edges thereof with side marginal portions of the strip material extending outboard of said rib formations.

4. An apparatus for inspecting a traveling strip of film or tape material as set forth in claim 2 wherein said light beam emitting member is a light conducting fiber optic conduit having a light receiving face confronting a light source and a light emitting face positioned to direct a controlled beam of light in predetermined relation to the surface of the material to be inspected.

5. An apparatus for inspecting a traveling strip of film or tape material as set forth in claim 2 wherein said light beam emitting member is positioned to direct a controlled beam of light onto the outwardly curved surface of material which is traversing said support means and wherein said sensor means comprises a pair of light actuated sensors arranged on opposite sides of said light emitting member and positioned to receive portions of the light beam reflected by said outwardly curved surface when the material is normal, said sensors being positioned for actuating the means for controlling the drive means when there is a predetermined interruption of the reflected portions of the light beam due to a torn portion of predetermined size in the material.

6. An apparatus for inspecting a traveling film or tape material so as to detect areas of more than normal thickness resulting from splices of excessive length and/or the presence on the material of pieces of tape exceeding a predetermined length, which apparatus comprises an inspection station having a support means for the material with spaced members providing narrow curved surfaces extending in the direction of travel on which the material advances so that major portions thereof are unsupported, a light source, a light transmitting fiber optic cable having its receiving end exposed to said light source and its emitting end supported at said inspection station in a position to direct a controlled beam of light into the path of the traveling material so that a predetermined increase in the effective thickness of the material at the inspection station will deflect at least a portion of the light beam, a light actuated sensor means having an element mounted at said inspection station in a position to receive a predetermined portion of the light beam when the effective thickness of the material is within predetermined limits, said light sensor means producing an output signal in response to changes in the light beam due to the presence of an area of excessive thickness extending a predetermined distance along the length of the material resulting from a splice of excessive length or the presence of a piece of tape exceeding a length corresponding to said predetermined distance, means for driving the material and control means for said material driving means which is responsive to said output signal so as to automatically stop the travel of the material when there is a splice or piece of tape presented at the inspection station exceeding a length corresponding to said predetermined distance.

7. In an apparatus for inspecting traveling film and tape materials so as to detect the presence of defects in the material in the form of torn sprocket holes, tears or the like, a support member over which the material is advanced in a curved path, means for driving the material along said path, a light beam emitting conduit member mounted outboard of said path and arranged to project a beam of light in the direction of said support member and along said path with at least a portion of the beam directed onto the curved portion of the exposed surface of the material so that upon the passage of material having an exposed surface without any of said defects the light beam will emerge from said surface at least in part along a first light path, a light actuated sensor mounted outboard of said curved path with its light admitting face positioned to intercept said first light path wherein the presence of any of said defects in the curved portion of said exposed surface causes said light beam to be deflected into a second light path different from said first light path, an indicator means, said sensor being connected to said indicator means and operating said indicator means when there is a predetermined change in the deflection of said beam resulting from the arrival of said support member of a defect of a predetermined character.

8. In an apparatus as set forth in claim 7 wherein said light beam emitting member is in the form of a fiber optic conduit having its light receiving end exposed to a light source which is remote from said support member.

9. In an apparatus as set forth in claim 7 wherein said light beam emitting member is positioned to direct a beam of light onto an area of the curved portion of said exposed surface of the material which is traversing said support member at an acute angle to said surface so that the beam will be deflected at least in part from a straight path into said first light path when the material surface is without any of said defects.

10. In an apparatus as set forth in claim 7 wherein said light beam emitting member is in the form of a fiber optic cable positioned so that the light beam is projected in a path generally tangential to said curved portion of said exposed surface of the material and portions of the beam are blocked or deflected into said second light path upon an increase in the effective thickness of the material for a predetermined distance along the length thereof.

11. In an apparatus as set forth in claim 7 wherein said light beam emitting member is positioned so that the light beam strikes the exposed surface of the material which is traversing said support member at an acute angle.

12. In an apparatus as set forth in claim 7 wherein said light beam emitting member is positioned so as to direct said light beam onto a predetermined spot on the surface of the material which is traversing said support member and wherein said light actuated sensor is positioned to receive a deflected portion of said light beam when said exposed surface is without any of said defects and to operate said indicator means when said beam portion is interrupted by the arrival at said support member of a defect of a predetermined character.

13. In an apparatus as set forth in claim 7 wherein said light beam emitting member is a fiber optic cable which receives light from a light source and which is positioned to direct a beam of light onto an area of the material to be inspected which may be increased in thickness by a splice or the presence of a strip or piece of foreign material and wherein said indicator means is operated by said sensor when the length of said increased thickness portion exceeds a predetermined length.

14. In an apparatus for inspecting traveling film and tape materials so as to detect the presence of defects in the material in the form of torn sprocket holes, tears or the like for inspecting a support member over which the material is advanced in a curved path, means for driving the material along said path, a light beam emitting conduit member mounted outboard of said path and arranged to project a beam of light in the direction of said support member with at least a portion of the beam directed onto the curved portion of the exposed surface of the material so that upon the passage of material having an exposed surface without any of said defects the light beam will emerge from said surface at least in part along a first light path, a light actuated sensor mounted outboard of said curved path with its light admitting face positioned to intercept at least part of said first light path wherein the presence of any of said defects in the curved portion of said exposed surface causes said light beam to be deflected into a second light path different from said first light path, an indicator means, said sensor being connected to said indicator means and operating said indicator means when there is a predetermined change in the deflection of said beam resulting from the arrival at said support member of a defect of a predetermined character, said material support member comprising relatively narrow outwardly bowed transversely spaced rib members on which the material rides and said light beam emitting member being positioned to direct a spot of light on an area of the outwardly bowed material which is unsupported and which normally contains a line of sprocket holes so that the deflection of the beam will be changed when a sprocket hole which is enlarged beyond predetermined normal size by tearing appears at the support member, and said light actuated sensor producing an output signal in response to changes in the deflection of the light beam due to the torn sprocket hole.

15. A system for inspecting traveling tape material so as to detect defects therein which tape material is in the form of movie film, video and audio tape and like material and which is subject to damage in use such as, tearing and improper splicing resulting in areas of excessive thickness which constitute undesirable defects, said system comprising means forming an inspection station, a support member at said station having an outwardly bowed surface, means for advancing the material over said bowed surface, an inspection head disposed in opposed relation to the bowed support surface, a light beam emitting member mounted in said inspection head so as to direct a beam of light in the direction of the outwardly bowed exposed surface of the tape material such that the light beam will emerge from said surface at least in part along a first light path when the material is without defects, a light actuated sensor mounted in said head with a light receiving face positioned in predetermined relation to said exposed surface so that the light intensity received by said sensor is dependent upon the condition of said exposed surface and changes therein due to presence of defects of predetermined character will cause the sensor, to produce an output signal and means connected to the sensor which is operative in response to said output signal to indicate the presence of the defect.

16. An apparatus for inspecting traveling movie film or similar strip material so as to detect sprocket hole enlargement and similar defects, said apparatus comprising an inspection station having a support means for the material which provides relatively narrow, laterally spaced, curved surfaces on which the material advances with major portions thereof unsupported, means for advancing the material over said surfaces, a light source, a light beam transmitting conduit having its receiving end exposed to said light source and its opposite end supported at said inspection station in a position to direct a beam of light toward said support means so that there is a spot of light of predetermined size projected onto the curved surface of the material at the inspection station, a pair of light actuated sensors mounted at said inspection station outboard of said material support means and on opposite sides of said beam transmitting conduit in a plane which is normal to the surface of the material to be inspected, each said sensor being positioned at an angle to the beam transmitting conduit so as to receive a portion of the light beam which is reflected from spaced points on said surface under normal conditions, said light sensors being responsive to changes in the light reflected resulting from interruption of the reflected portions of the beam due to the appearance of a hole in the material exceeding a predetermined dimension in the direction of advance of the material and control means for the material advancing means which is responsive to operation of said light sensor means so as to automatically stop the advance of the material when a hole exceeding a predetermined size is presented at the inspection station.

17. An apparatus as set forth in claim 16 wherein means is provided for adjusting the dimension of the spot of light projected onto the film so as to enable the apparatus to be adjusted to detect the presence of holes of varying size.

18. An apparatus as set forth in claim 16 wherein means is provided for varying the spacing of the surface of the material to be inspected from the light receiving faces of the sensors so as to enable the apparatus to be adjusted to detect the presence of holes of varying size.

19. A machine for inspecting movie film or similar strip material and for detecting defects of a predetermined character in the material including variations in thickness exceeding a predetermined length due to improper splicing or the presence of adhesive tape or the like and damage in the form of edge tears, holes and the like, which machine comprises means for supporting the strip material for advance along a predetermined path, a plurality of inspection stations spaced along said path, means for advancing said strip material through said inspection stations, a single light source, a plurality of fiber optic light conduits each of which conduits has one end disposed so as to receive light from said single light source and the opposite end disposed adjacent an inspection station so as to direct a light beam in predetermined angular relation onto the exposed surface of said traveling strip material, light sensor means positioned relative to the beam emitting end of each said conduit and said exposed material surface so as to produce an output signal when there is a change in the light received from the associated conduit which change results from the presence of one of said defects in the traveling material, and means actuated by said output signal for interrupting the strip material advancing means when one of said defects is detected by said sensing means.

* * * * *